United States Patent
Fukuda et al.

(10) Patent No.: US 9,160,048 B2
(45) Date of Patent: Oct. 13, 2015

(54) ELECTRONIC DEVICE WITH TERMINAL CIRCUITS

(71) Applicant: FUJITSU LIMITED, Kawasaki-shi, Kanagawa (JP)

(72) Inventors: Takashi Fukuda, Machida (JP); Masaki Tosaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 279 days.

(21) Appl. No.: 13/834,555

(22) Filed: Mar. 15, 2013

(65) Prior Publication Data
US 2013/0321098 A1    Dec. 5, 2013

(30) Foreign Application Priority Data

Jun. 4, 2012 (JP) ................................. 2012-127326

(51) Int. Cl.
*H01P 5/12* (2006.01)
*H01P 1/26* (2006.01)
*H04L 25/02* (2006.01)

(52) U.S. Cl.
CPC .............. *H01P 1/26* (2013.01); *H04L 25/0278* (2013.01)

(58) Field of Classification Search
CPC .......... H01P 5/12; H01P 1/26; H04L 25/0278
USPC ............................................ 333/124, 125, 32
See application file for complete search history.

(56) References Cited

U.S. PATENT DOCUMENTS

| 6,194,979 B1 | 2/2001 | Bloom et al. |
| 6,937,111 B2 * | 8/2005 | Kwon ........................... 333/100 |
| 8,195,855 B2 * | 6/2012 | Jeong et al. ................... 710/100 |

FOREIGN PATENT DOCUMENTS

| JP | 2000-340956 | 12/2000 |
| JP | 2000-357960 | 12/2000 |
| JP | 2004-222092 | 8/2004 |
| JP | 2008-311347 | 12/2008 |
| JP | 2010-080671 | 4/2010 |

\* cited by examiner

*Primary Examiner* — Robert Pascal
*Assistant Examiner* — Kimberly Glenn
(74) *Attorney, Agent, or Firm* — Staas & Halsey LLP

(57) ABSTRACT

A semiconductor device includes: a terminal configured to input a signal from a signal source; a receiver configured to receive the signal from the signal source through the terminal; and a terminal circuit configured to be coupled between the terminal and an input end of the receiver, and to suppress reflected wave caused by signal reflection at the receiver, wherein impedance of a wire line connecting the terminal and the input end of the receiver, and direct-current impedance of a resistance component included in the terminal circuit are set lower than impedance of an external wire line connected to the terminal.

7 Claims, 7 Drawing Sheets

ELECTRONIC DEVICE WITH TERMINAL CIRCUITS

CROSS-REFERENCE TO RELATED APPLICATION

This application is based upon and claims the benefit of priority of the prior Japanese Patent Application No. 2012-127326, filed on Jun. 4, 2012, the entire contents of which are incorporated herein by reference.

FIELD

The embodiments discussed herein are related to an electronic device and a semiconductor device.

BACKGROUND

A Fly-by connection is provided as one of methods of connecting a plurality of receivers to one signal source, such as a driver, etc. The Fly-by connection is a method of connecting a plurality of receivers in a daisy chain, and is also referred to as a connection one after another, or a daisy chain connection. For example, the Fly-by connection is used for connecting a memory controller, which operates as a driver, and memories, such as a plurality of SDRAMs (Synchronous Dynamic Random Access Memories), etc., which operate as receivers.

In the case where a signal transmission speed is low, and a rising time and a falling time of the signal are long, in a configuration of connecting a plurality of receivers in a Fly-by connection, there has not been much problem with reflection at branch parts caused by signal reflection at the individual receivers. In the case where a signal transmission speed becomes high, and a rising time and a falling time become short, when a plurality of receivers are connected by a Fly-by connection, multiple reflection at branch parts occurs because of signal reflection at the individual receivers, and thus there is a problem in that reflected waves overlap with each other, and quality of a signal waveform is deteriorated.

As a countermeasure, there is a method of adjusting a line length of a signal transmission line such that reflected waves do not overlap with each other, and a method of inserting a stub resistor into a part of a daisy chain, etc. Also, there is a method of controlling impedance of a wire line of a main line part that connects from a signal source to a branch, and between individual branches, and impedance of wire lines of branch parts that connect branches and receivers. However, it is demanded to have an implementation area by any one of the methods, and it is difficult to uniquely determine impedance or a resistor value of a wire line depending on enlargement of a wiring area and a package characteristic of a receiver to user. Accordingly, it becomes difficult to apply these methods.

In a Fly-by connection, if a branch length is zero, there becomes no problem with the above-described problem of reflection. However, in a receiver package actually used, there are package line lengths of wire bonding, etc., that connects a die on which a circuit is formed and terminals of the package. Accordingly, for example, even if branch lengths are zero on a printed circuit board, branch lengths necessarily arise because of package line lengths, and overlapping of reflected waves due to multiple reflection occurs. Further, package line lengths are different depending on a receiver used. Also, package line lengths are different in accordance with a connected signal, and thus it is difficult to take a measure against reflection at branch parts on the side of the printed circuit board.

Also, there is a technique in which impedance of two transmission lines after a branch is made two times impedance of the transmission line before the branch in order to match impedance so that influence of signal reflection is suppressed (for example, refer to Japanese Laid-open Patent Publication No. 2004-222092). However, this technique is suitable for a star-connection configuration, but is difficult for applying to a configuration in which a large number of receivers are connected to one signal source in a Fly-by connection. For example, in the case of applying the technique to a configuration in which four receivers are connected to one signal source in a Fly-by connection, impedance of the transmission lines of the branch parts of the receiver becomes two times, four times, eight times, and 16 times, which are unattainable impedance values on a printed circuit board having a same layer configuration.

SUMMARY

According to an aspect of the embodiments, a semiconductor device includes: a terminal configured to input a signal from a signal source; a receiver configured to receive the signal from the signal source through the terminal; and a terminal circuit configured to be coupled between the terminal and an input end of the receiver, and to suppress reflected wave caused by signal reflection at the receiver, wherein impedance of a wire line connecting the terminal and the input end of the receiver, and direct-current impedance of a resistance component included in the terminal circuit are set lower than impedance of an external wire line connected to the terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the following, a description will be given of an embodiment of the present disclosure with reference to the drawings.

Figure 1:
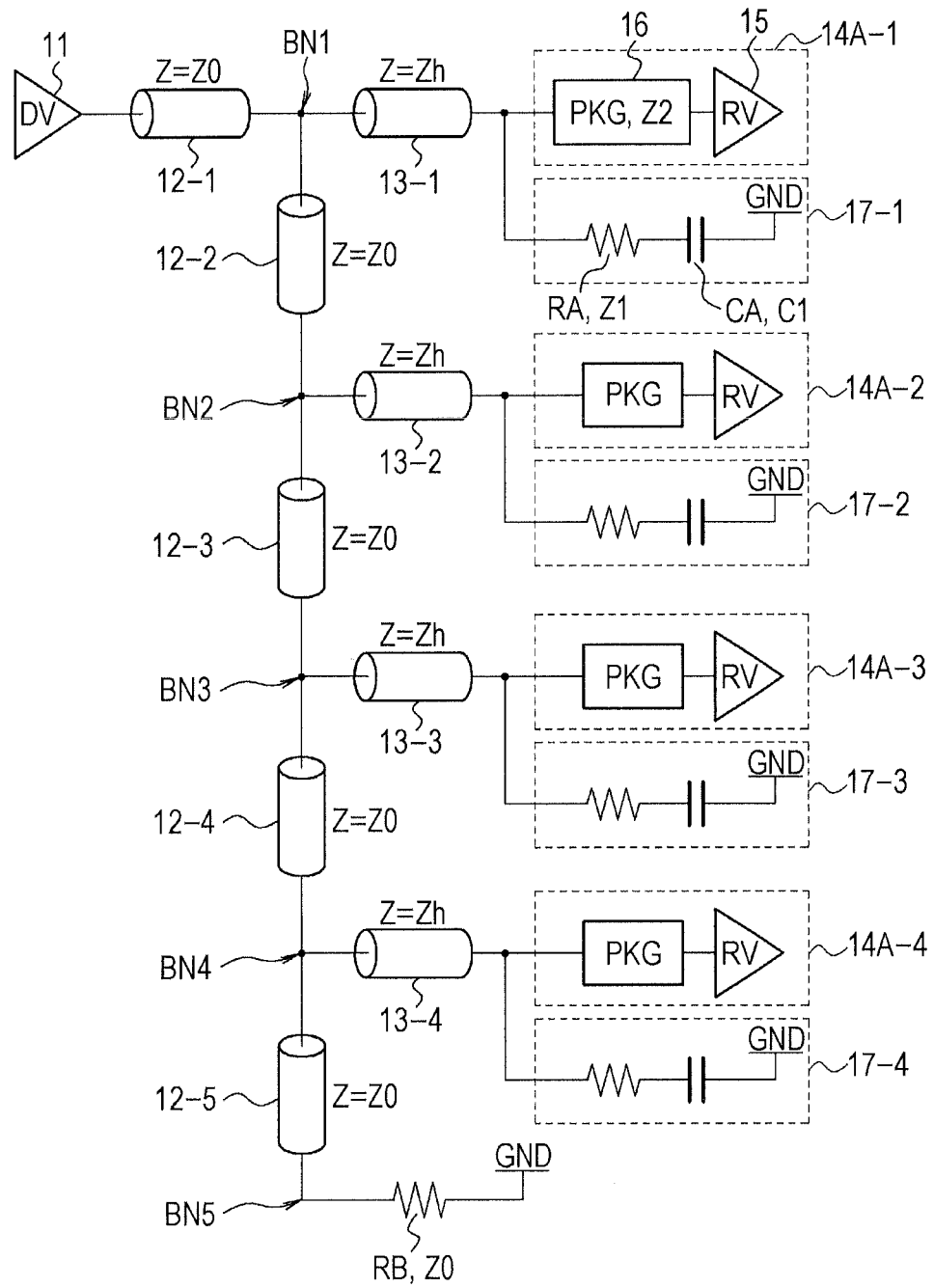
FIG. 1 is a diagram illustrating an example of a configuration of an electronic device according to an embodiment of the disclosure.

FIG. 1 is a diagram illustrating an example of a configuration of an electronic device according to an embodiment of the present disclosure. In the electronic device according to the present embodiment, a plurality of receivers 15 are connected to a driver 11, which is one signal source, in a Fly-by connection (a daisy chain connection). That is to say, the plurality of receivers 15, which receive a signal from the signal source, are wired in a daisy chain. Also, the electronic device according to this embodiment includes terminal circuits 17 (17-1 to 17-4) corresponding to the individual receivers 15, respectively.

Packages 14A (14A-1 to 14A-4) of the receivers including a die (semiconductor chip) on which circuits of the receivers 15 are formed, and terminal circuits 17 (17-1 to 17-4) formed outside of the packages 14A are mounted on a printed circuit board, for example. In this regard, individual configurations of the packages 14A-1 to 14A-4 of the receivers may be the same, and individual configurations of the terminal circuits 17-1 to 17-4 may be the same. Each of the packages 14A-1 to 14A-4 may be a semiconductor device.

The driver 11 and the packages 14A-1 to 14A-4 of the receivers are connected in a daisy chain by wire lines 12 (12-1 to 12-5) and 13 (13-1 to 13-4) formed on the printed circuit board. In this regard, reference numeral 16 schematically illustrates wire lines in the package, such as wire bonding, etc., for connecting the die, on which circuits of the receivers 15 are formed, and the terminals of the package 14A.

The wire lines 12-1 to 12-5 are wire lines of main line part connecting between the driver 11, which is a signal source, and a branch point, and among the individual branch points. Also, the wire lines 13-1 to 13-4 are wire lines of the branch parts that connect the branch points and the packages 14A-1 to 14A-4 of the receivers, respectively. One end of the main line including the wire lines 12-1 to 12-5 is connected to the output terminal of the driver 11 as a signal source, and the other end is connected to a resistor RB.

In the example illustrated in FIG. 1, the driver 11 and a branch point BN1 is connected by the wire line 12-1 of the main line part, a branch point BNi (i=1, 2, 3, 4, hereinafter the same) and a branch point BN (i+1) are connected by the wire line 12−(i+1) of the main line part. The resistor RB is connected to a branch point BNS. Also, the branch point BNi and the input terminal of the package 14A-i of the receiver are connected by the wire line 13-i of the branch part.

The terminal circuits 17-1 to 17-4 are circuits for absorbing reflected waves caused by reflection of a signal at the corresponding receivers 15, respectively, and for suppressing frequency components of the reflected waves. The terminal circuits 17-1 to 17-4 are connected between the branch part 13 and the packages 14A of the receivers, respectively. The terminal circuits 17-1 to 17-4 include series circuits in which a capacitor and a resistor are connected in series, for example.

In the example illustrated in FIG. 1, the terminal circuit 17-i includes a capacitor CA and a resistor RA. One of electrodes to the capacitor CA is connected to ground potential GND, and the other of the electrodes is connected to one end of the resistor RA. Also, the other end of the resistor RA of the terminal circuit 17-i is connected between the wire line 13-i of the branch part, and the input terminal of the package 14A-i of the receiver. In this regard, in FIG. 1, the terminal circuits 17-1 to 17-4 including the series circuit of the capacitor CA and the resistor RA are illustrated as an example. However, an embodiment is not limited to this. The terminal circuits 17-1 to 17-4 ought to have low impedance and a separable configuration in DC (direct current), and the circuit configuration may be changed. In this regard, the impedance of the wire line 13-i of the branch part may be set higher than the impedance of the resistor RA included in the terminal circuit 17-i corresponding to the package 14-i of the receiver, or the direct-current impedance.

In this regard, the case where four receivers 15 are provided as a plurality of receivers 15 is illustrated in FIG. 1 as an example. However, the number of receivers 15 is not limited to this, and any number of receivers 15 may be used. In the case where an electronic device according to the present embodiment is applied to a system including a plurality of memories, the driver 11 is an ASIC (Application specific Integrated Circuit) or a memory controller, for example, and the receiver 15 is a memory, such as an SDRAM, etc., for example.

Figure 2:
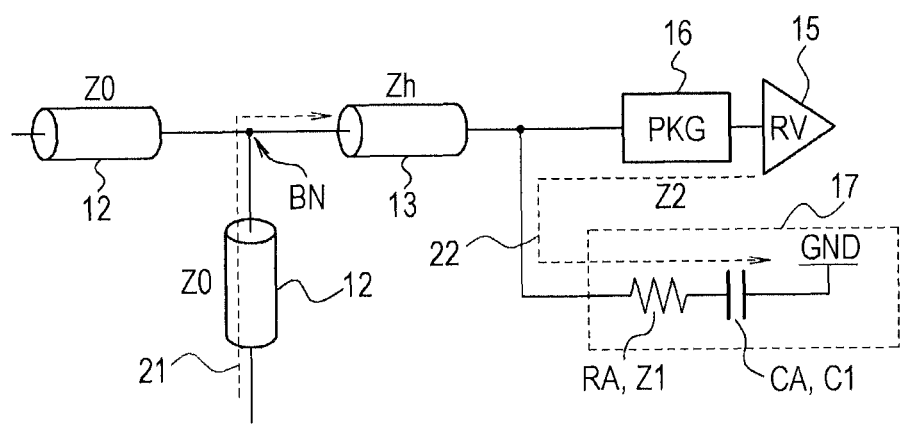
FIG. 2 is an explanatory diagram of suppression of reflection in the electronic device according to the present embodiment.

Here, in the electronic device illustrated in FIG. 1, it is assumed that impedance of the individual wire lines 12-1 to 12-5 of the main line part is Z0, impedance of the resistance components of the individual terminal circuits 17-1 to 17-4 is Z1, and impedance of the internal wire lines 16 of the packages 14A-1 to 14A-4 of the individual receivers is Z2. In this embodiment, impedance Zh of the individual wire lines 13-1 to 13-4 of the branch parts is set higher than any one of Z0, Z1, and Z2. That is to say, the impedance Zh of the wire lines 13 of the branch parts is set higher than the impedance Z0 of the wire lines 12 of the main line part, the impedance Z1 of the resistance components of the terminal circuits 17, and the impedance Z2 of the internal wire lines 16 of the package 14A. In this manner, impedance of the wire lines 13 of the branch parts is set high, and thus it is possible to suppress reflected waves (a component 21 illustrated in FIG. 2) from the other branch points.

However, if the impedance of the wire lines 13 of the branch parts is simply set high, although reflection from the other branch points is suppressed, reflected waves caused by signal reflection at the receivers 15 are re-reflected so that ringing becomes large, thereby deteriorating the quality of a signal waveform. A description will be given of the deterioration of the quality of the signal waveform with reference to FIG. 3, FIG. 4A, and FIG. 4B.

Figure 3:
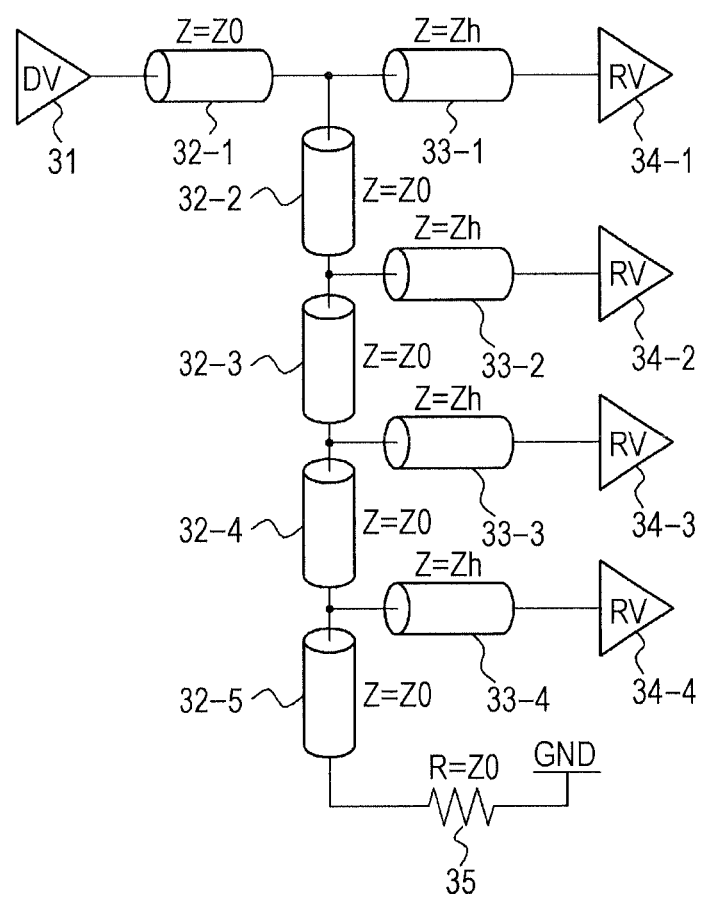
FIG. 3 is a diagram illustrating an example of a configuration of a simulation-target electronic device.
Figure 4A:
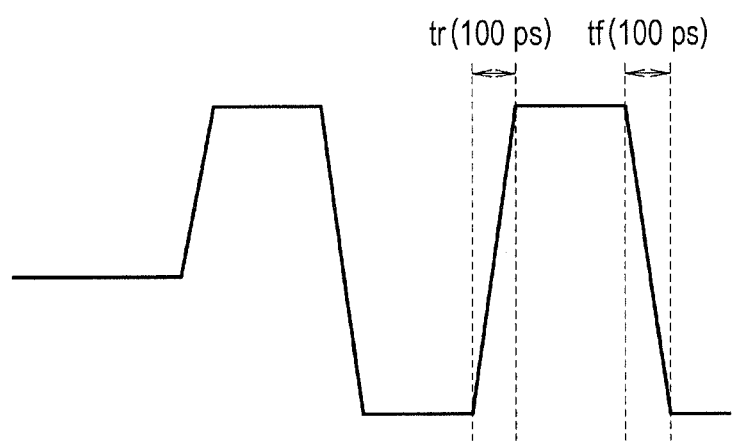
FIG. 4A and FIG. 4B are diagrams illustrating simulation results of the configuration illustrated in FIG. 3.

As illustrated in FIG. 3, it is assumed that the driver 31 and a plurality of receivers 34-1 to 34-4 are connected through the wires line 32-1 to 32-5 of the main line part and the wire lines 33-1 to 33-4 of the branch part in a daisy chain (Fly-by connection). In the configuration illustrated in FIG. 3, a simulation result of the signal waveform observed at the input terminal of the receiver 34-1 when a signal illustrated in FIG. 4A is outputted from the driver 31 is a waveform chart illustrated in FIG. 4B. In this regard, it is assumed that the impedance of the wire lines 32-1 to 32-5 of the main line part is Z0, and the impedance of the wire lines 33-1 to 33-4 of the branch part is Zh. Also, it is assumed that both a rising time tr and a falling time tf of the signal outputted from the driver 31 are 100 ps.

Figure 4B:
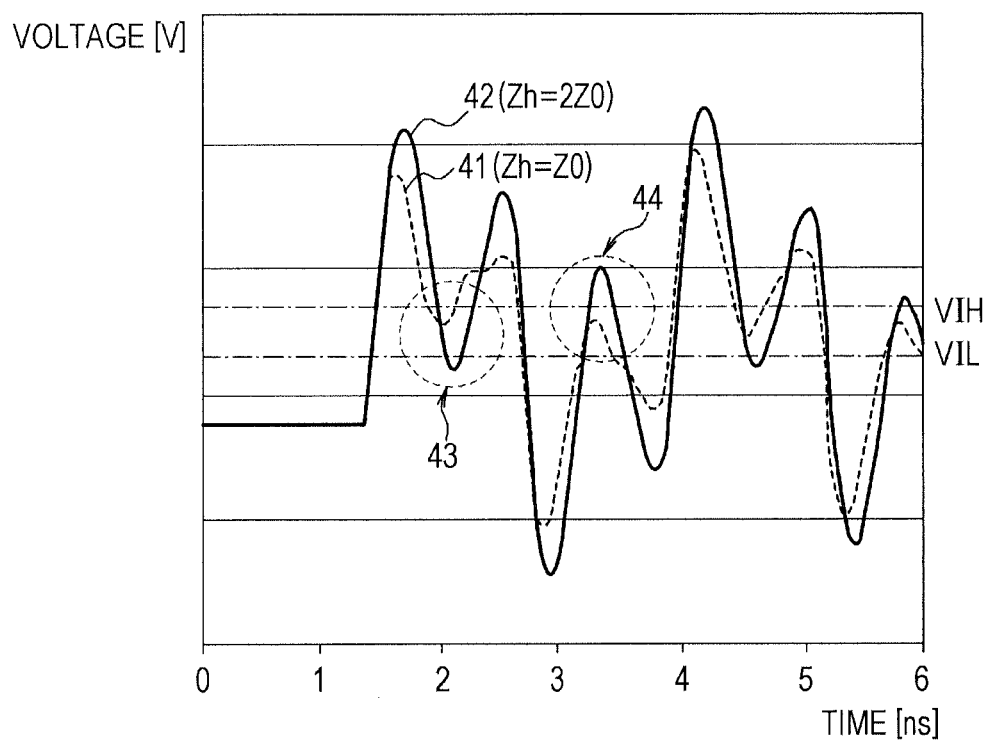

In FIG. 4B, a waveform 41 denoted by a broken line illustrates a waveform when the impedance Zh of the wire lines 33-1 to 33-4 of the branch part is made the same as the impedance Z0 of the wire lines 32-1 to 32-5 of the main line part (Zh=Z0). Also, a waveform 42 denoted by a solid line illustrates a waveform when the impedance Zh of the wire lines 33-1 to 33-4 of the branch part is two times the impedance Z0 of the wire lines 32-1 to 32-5 of the main line part (Zh=2Z0). As illustrated in the waveforms 41 and 42, a reflected wave caused by signal reflection at the receiver is re-reflected, and thus the signal waveform is deteriorated. For example, by reflection at the receiver, the signal level sometimes becomes lower than a threshold value VIH at the time of rising of the signal (for example, a part 43), and the signal level sometimes becomes higher than the threshold value VIL at the time of falling of the signal (for example, a part 44).

Figure 5:
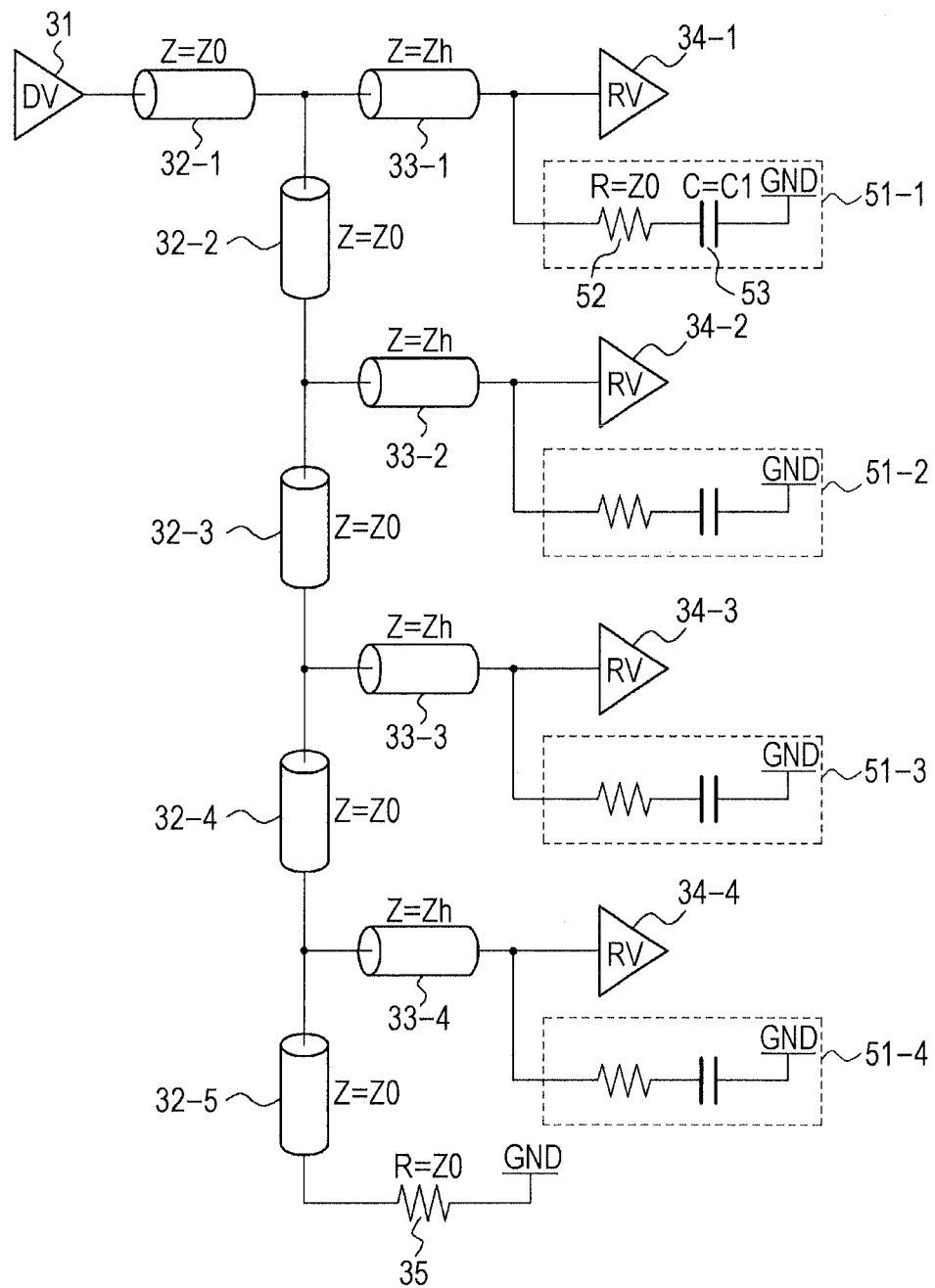
FIG. 5 is a diagram illustrating an example of a configuration of a simulation-target electronic device.

In contrast, a description will be given that a terminal circuit is disposed between the branch part 33 and the receiver 34 in order to absorb reflected waves by signal reflection at the receiver so as to improve signal waveform as illustrated in this embodiment with reference to FIG. 5, FIG. 6A, and FIG. 6B. In FIG. 5, a same reference sign is given to a same component as the component illustrated in FIG. 3, and a duplicated description will be omitted. In the configuration illustrated in FIG. 5, in contrast with the configuration illustrated in FIG. 3, terminal circuits 51-1 to 51-4, in which a resistor 52 and a capacitor 53 are connected in series, are disposed between the branch parts 33-1 to 33-4 and the receivers 34-1 to 34-4, respectively. It is assumed that impedance of the resistor 52 is the same as the impedance Z0 of the wire lines 32-1 to 32-5 of the main line part. Also, it is assumed that a capacitance value C1 of the capacitor 53 is determined to be a value that makes the impedance sufficiently small in the frequency domain included in the edge of the reflected waveform.

Figure 6A:
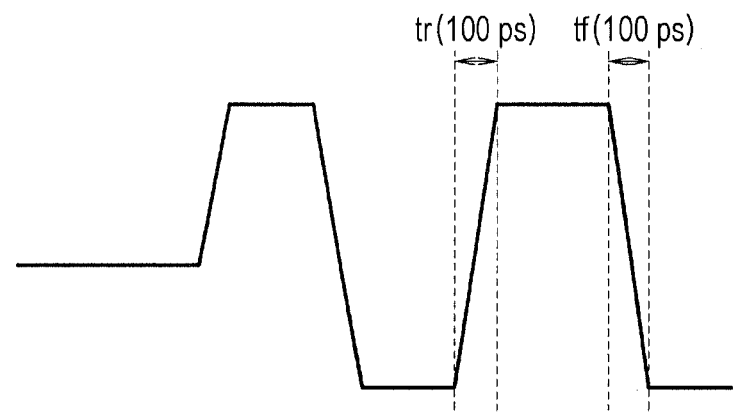
FIG. 6A and FIG. 6B are diagrams illustrating simulation results of the configuration illustrated in FIG. 5.
Figure 6B:
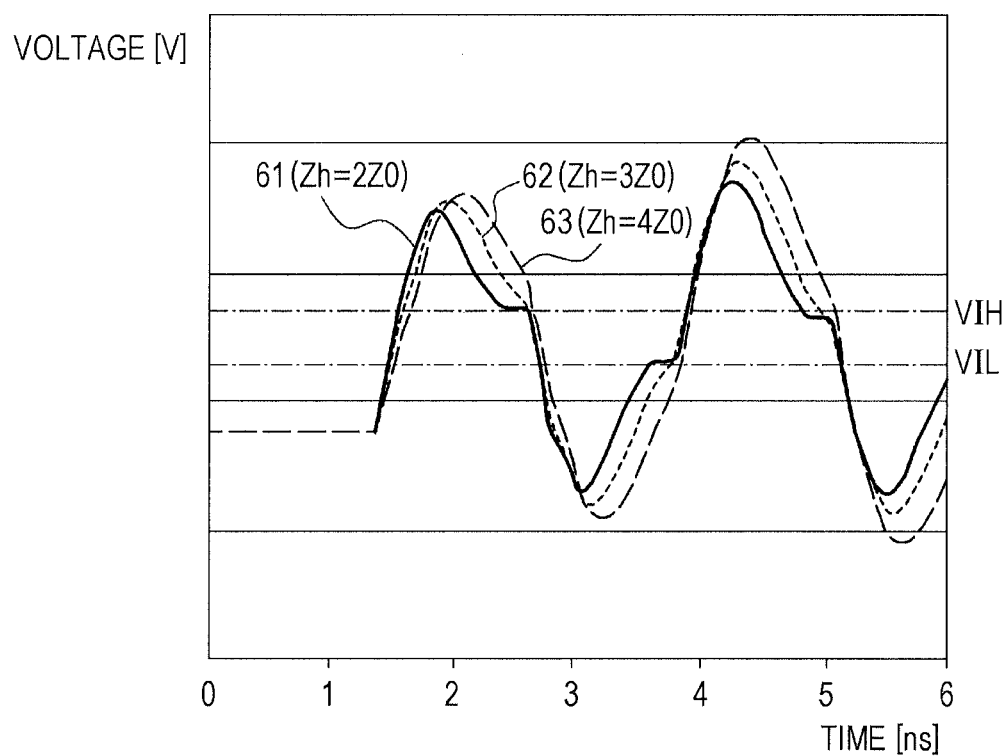

A waveform chart in FIG. 6B is illustrated on the basis of a simulation result of the signal waveform that is observed at the input terminal of the receiver 34-1 when the driver 31 outputs the same signal illustrated in FIG. 6A as that of FIG. 4A in the configuration illustrated in FIG. 5. In FIG. 6B, a waveform 61 denoted by a solid line indicates a waveform when the impedance Zh of the wire lines 33-1 to 33-4 of the branch part is two times the impedance Z0 of the wire lines 32-1 to 32-5 of the main line part (Zh=2Z0). Also, a waveform 62 denoted by a short broken line indicates a waveform when the impedance Zh of the wire lines 33-1 to 33-4 of the branch part is three times the impedance Z0 of the wire lines 32-1 to 32-5 of the main line part (Zh=3Z0). Also, a waveform 63 denoted by a long broken line indicates a waveform when the impedance Zh of the wire lines 33-1 to 33-4 of the branch part is four times the impedance Z0 of the wire lines 32-1 to 32-5 of the main line part (Zh=4Z0).

As illustrated in waveforms 61, 62, and 63, by providing terminal circuits 51-1 to 51-4, there is not deterioration of the signal waveform caused by ringing, which was observed by the waveforms 41 and 42 illustrated in FIG. 4B, and quality of a signal waveform is improved. That is to say, in the electronic device illustrated in FIG. 1, by providing terminal circuits 17 for absorbing the reflected waves caused by signal reflection at the receivers 15, it is possible to suppress reflected waves caused by reflection at the receiver 15 (the component 22 illustrated in FIG. 2), and to avoid deterioration of quality of a signal waveform.

Here, in the electronic device illustrated in FIG. 1, it is assumed that the capacitance value C1 of the capacitor CA included in the terminal circuits 17-1 to 17-4 is a value that makes the impedance sufficiently small so that it is possible to separate in DC in the frequency domain included in the edge of the reflected waveform in the same manner as that described in FIG. 5. For example, if it is assumed that a rising time tr of the signal and a falling time tf of the signal is 100 ps, a frequency component f included in the edge becomes f=0.35/(tr or tf)=3.5 GHz. At this time, in order for the impedance become tens of ohms, the capacitance value C1 of the capacitor CA ought to be 10 pF or less. If determined to be a few picofarads (2 to 3 pF), the impedance preferably becomes about 10 to 30Ω. Also, the resistor RA included in the terminal circuits 17-1 to 17-4 ought to be determined so that the impedance Z1 is lower than the impedance Zh of the wire lines 33-1 to 33-4 of the branch part, and is preferably the same as the impedance Z0 of the wire lines 32-1 to 32-5 of the main line part.

By the present embodiment, in electronic device in which a plurality of receivers 15 are connected to a signal source in a Fly-by connection (a daisy chain connection), the impedance of the wire lines 13 of the branch parts that connect the branch points and the package 14A of the receiver is set high. That is to say, the impedance of the wire lines 13 of the branch parts is set higher than any one of the impedance of the wire lines 12 of the main line part connecting between the signal source and the branch point and between the branch points, the impedance of the wire lines 16 in the packages 14A in the receivers, and the impedance of the resistance components of the terminal circuits 17. Also, terminal circuits 17 are connected between the wire lines 13 of the branch parts and the packages 14A of the receivers, respectively, in order to absorb the reflected wave caused by signal reflection at the receiver 15. By setting the impedance of the wire line 13 of the branch part high, it is possible to suppress the reflected waves from the other branch points. And by providing the terminal circuits 17, it becomes possible to absorb the reflected waves from the receivers 15, and to suppress deterioration of the signal waveform caused by reflection.

Figure 7:
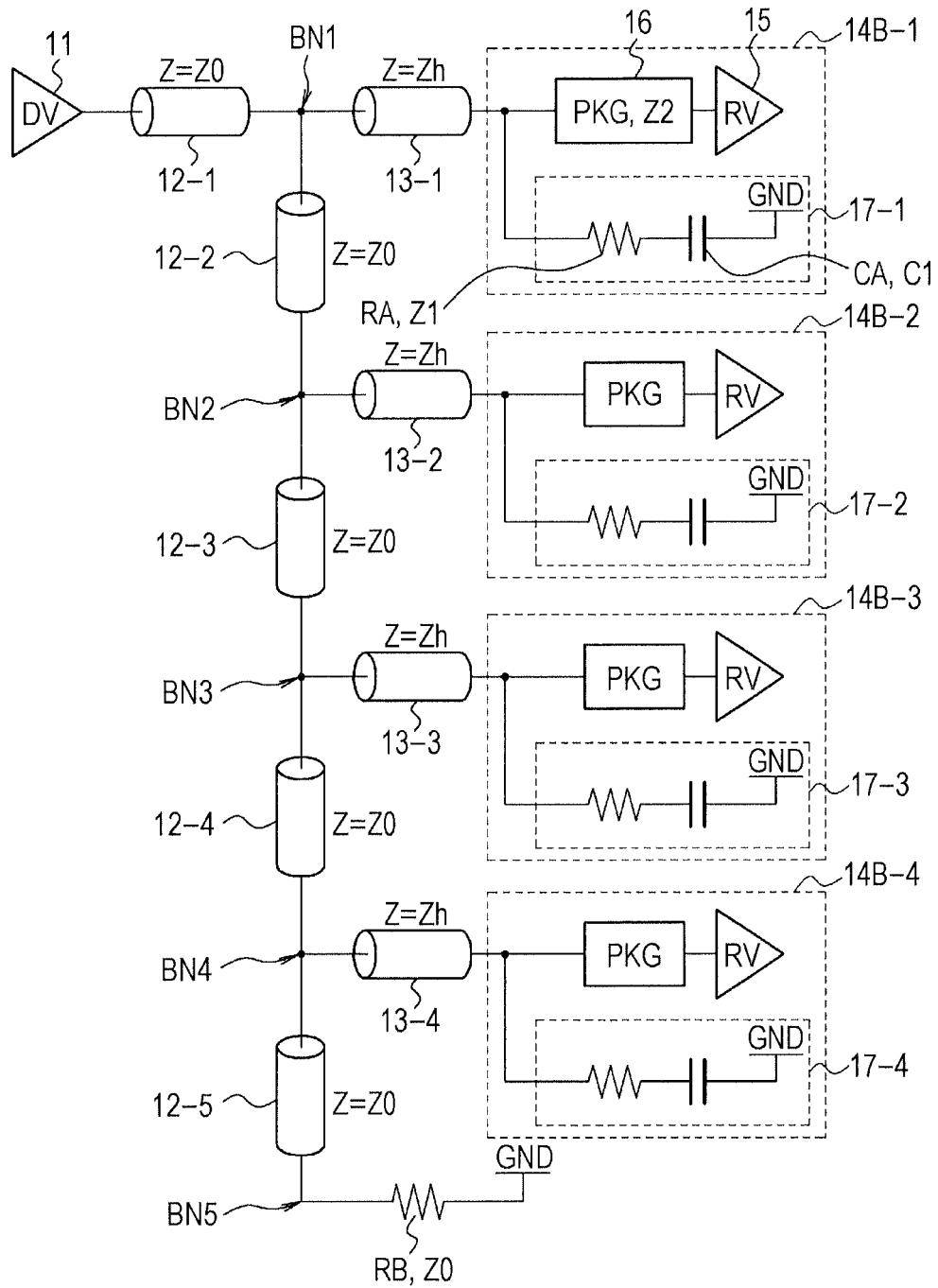
FIG. 7 is a diagram illustrating another example of a configuration of an electronic device according to an embodiment of the present disclosure.

In this regard, in the electronic device according to the above-described embodiment, an example of a configuration in which the terminal circuits 17 are formed outside the package 14A of the receiver. However, the present disclosure is not limited to this. For example, as illustrated in FIG. 7, a configuration in which a receiver 15 and a terminal circuit 17 are formed in one package 14B may be employed. In FIG. 7, a same reference sign is given to a component having a same function as the component illustrated in FIG. 1, and a duplicated explanation is omitted. In the case of employing the configuration illustrated in FIG. 7, the impedance of the wire lines 13 of the branch parts ought to be specified in accordance with the impedance, etc., of the resistance component included in the terminal circuits 17. Alternatively, the impedance, etc., of the resistance component included in the terminal circuits 17 ought to be set lower than the impedance of the wire lines 13 of the connected branch parts.

In this regard, the above-described embodiment is only one example for substantiation of the present disclosure, and thus the technical range of the present disclosure is not to be understood limited. That is to say, the present disclosure may be achieved in various forms without departing from the spirit and scope or major characteristics of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An electronic device, comprising:
   a plurality of semiconductor devices configured to be connected to a signal source in a daisy chain;
   a first wire line configured to connect from the signal source to branch points in the daisy chain, and to connect between selected ones of the branch points;
   second wire lines configured to connect the branch points and input terminals of the semiconductor devices corresponding to the branch points, respectively; and terminal circuits configured to be connected between the second wire lines and the input terminals of the semiconductor devices, and to suppress reflected wave based on signal reflection of the semiconductor devices, wherein impedance of one of the second wire lines is higher than one of impedance of the first wire line, impedance of a wire line in a package including the semiconductor devices, and direct-current impedance of a resistance component included by the terminal circuits.

2. The electronic device according to claim 1,
wherein the terminal circuits corresponding to the semiconductor devices are formed outside the packages including the semiconductor devices.

3. The electronic device according to claim 1,
wherein the semiconductor devices and the terminal circuits corresponding to the semiconductor devices are formed in the package.

4. The electronic device according to claim 1,
wherein the semiconductor devices include an SDRAM.

5. The electronic device according to claim 1,
wherein each of the terminal circuits include a series circuit including a capacitor and a resistor connected in series.

6. A semiconductor device, comprising:
a terminal configured to input a signal from a signal source;
a receiver configured to receive the signal from the signal source through the terminal; and
a terminal circuit configured to be coupled between the terminal and an input end of the receiver, and to suppress reflected wave caused by signal reflection at the receiver,
wherein impedance of a wire line connecting the terminal and the input end of the receiver, and direct-current impedance of a resistance component included in the terminal circuit are set lower than impedance of an external wire line connected to the terminal.

7. The electronic device according to claim 1,
wherein the impedance of the second wire line is higher than impedance of the resistance component included by the terminal circuit.

\* \* \* \* \*